March 31, 1953     I. A. GREENWOOD, JR     2,633,570
RADIO NAVIGATION SYSTEM
Filed Oct. 19, 1945     3 Sheets-Sheet 1

*INVENTOR.*
IVAN A. GREENWOOD JR.
BY
William D. Hall,
ATTORNEY

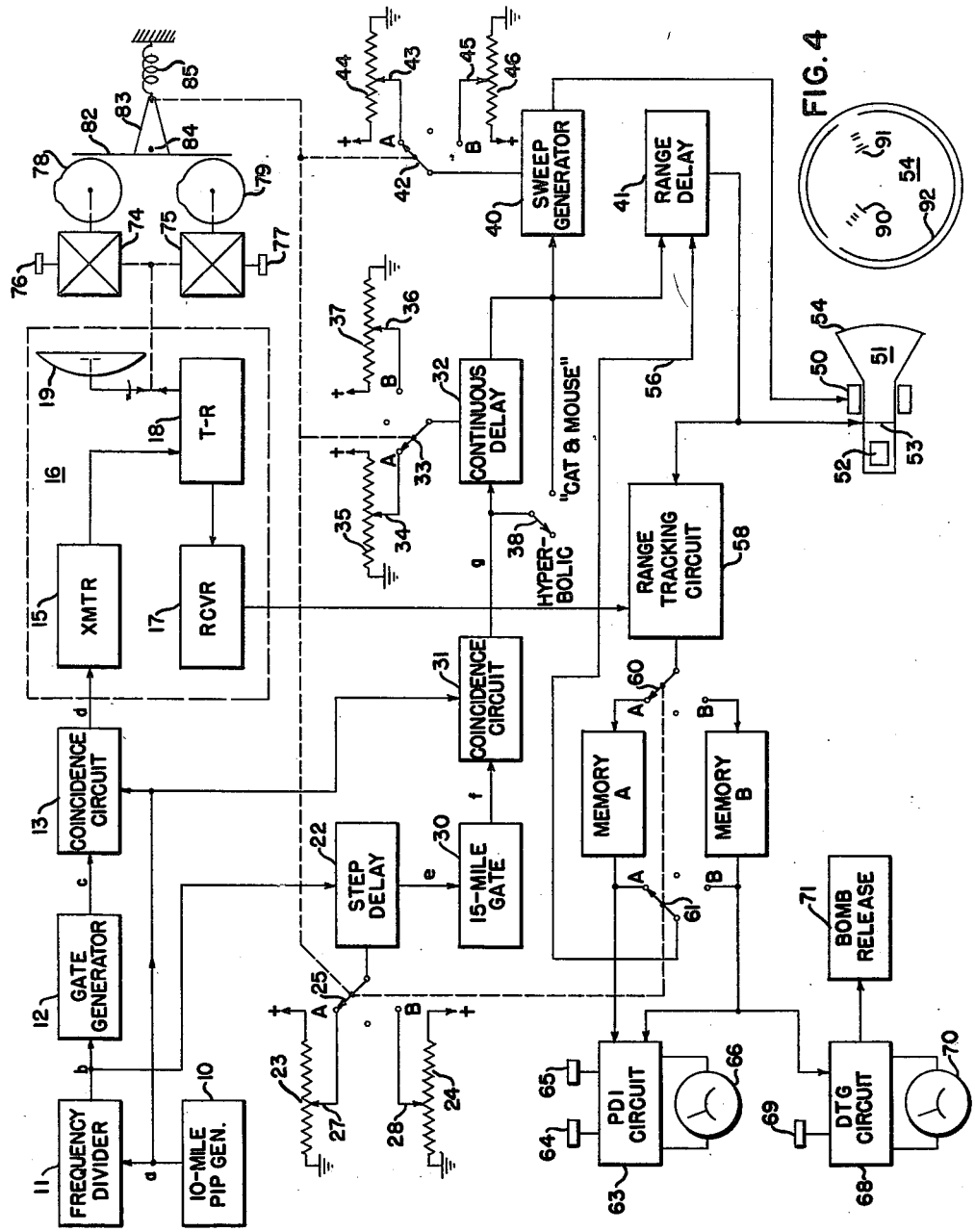

March 31, 1953     I. A. GREENWOOD, JR     2,633,570

RADIO NAVIGATION SYSTEM

Filed Oct. 19, 1945     3 Sheets-Sheet 3

*INVENTOR.*
IVAN A. GREENWOOD JR.
BY
William D. Hall
ATTORNEY

Patented Mar. 31, 1953

2,633,570

UNITED STATES PATENT OFFICE 2,633,570

RADIO NAVIGATION SYSTEM

Ivan A. Greenwood, Jr., Boston, Mass., assignor, by mesne assignments, to the United States of America as represented by the Secretary of War Application October 19, 1945, Serial No. 623,402

4 Claims. (Cl. 343—15)

This invention relates to electrical apparatus and more particularly to a system for accurately navigating an aircraft to a predetermined point.

In navigating an aircraft to a predetermined destination, use may be made of radio responder beacons having known positions. The beacons may be of the type which, when interrogated by the radio object detection apparatus carried by the aircraft, respond with a radio frequency reply. The response of the beacon may be a series of pulses uniquely coded to distinguish it from other responding beacons. The time elapsing between the transmission of the interrogating pulse from the aircraft and the receipt by the aircraft of the beacon response determines the range from the aircraft to the beacon.

It is an object of this invention to provide a system whereby an aircraft may be accurately navigated to a predetermined destination by the use of responder beacons. It is a further object to arrange said system so that a plurality of aircraft can use the same beacons to navigate to different destinations. It is also an object to arrange said system so that one of a plurality of different navigating methods may be selected in navigating to the predetermined destination.

Other objects, features, and advantages of this invention will suggest themselves to those skilled in the art and will become apparent from the following description of the invention taken in connection with the accompanying drawing in which:

Fig. 3 is a block diagram of a navigating system employing the principles of this invention;

Fig. 4 shows the viewing screen of the indicator tube in Fig. 3;

Figure 1:
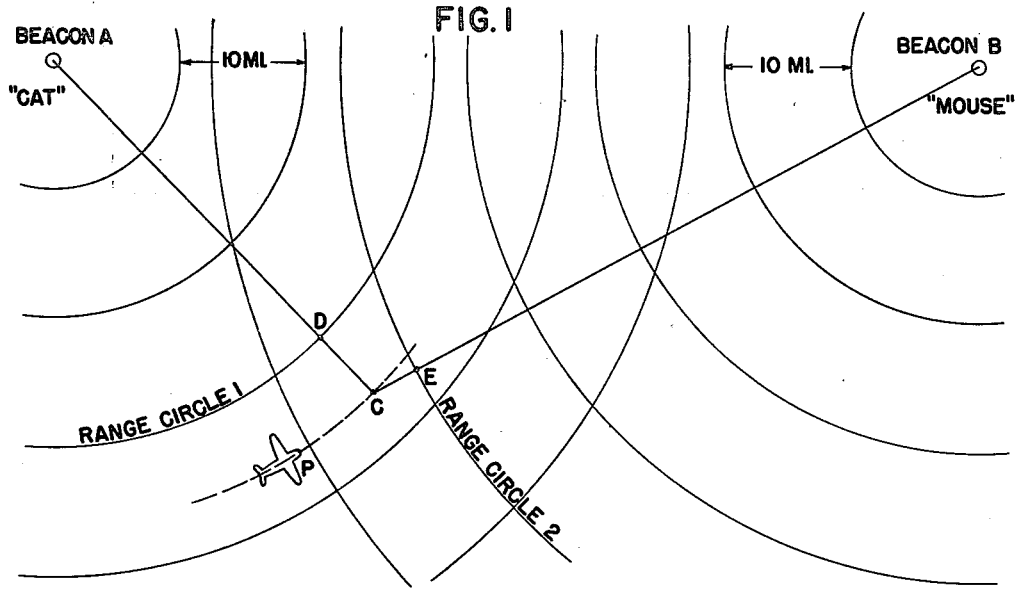
Fig. 1 is a diagram used in explaining one method of beacon navigation.

Reference is now made more particularly to Fig. 1 for a general explanation of one navigational method, known as the "cat and mouse" approach. Radio responder beacons are designated as beacons A and B, while C is the destination or point to which the aircraft P is to be accurately navigated. If bombs are to be dropped, point C becomes the bomb release point and is determined from the position of the target, by predetermining the altitude, speed, and heading of the aircraft at the bomb release point and by predicting the velocity and direction of the wind at the expected time of bomb release.

One method by which the aircraft may accurately navigate to the bomb release point includes flying at a constant distance from one beacon, known as the "cat" beacon, and shown as beacon A in Fig. 1. The bombs are released when the aircraft arrives at the proper distance from beacon B, known as the "mouse" beacon.

When the "cat and mouse" bombing approach is used, voltages may be produced, each of which is proportional to the range from the aircraft to one beacon. Each of these voltages may be compared with a fixed voltage preset to a value corresponding to the range from the bomb release point to each of the beacons.

If a voltage corresponding to the entire range to a beacon, such as A—C in Fig. 1, is used for comparison with a fixed voltage, the percentage variation of the changing range voltage is small and it is difficult to make the comparison with a high degree of precision. It is therefore more satisfactory if the range of the aircraft is tracked with respect to a fixed range circle such as range circles 1 or 2 designated in Fig. 1. Voltages corresponding to the ranges from the aircraft to range circles 1 and 2 are therefore compared with voltages corresponding to the distances C—D and C—E. The percentage variation of the changing range voltages is then high and the comparison with the fixed voltages may be readily made with precision.

Figure 2:
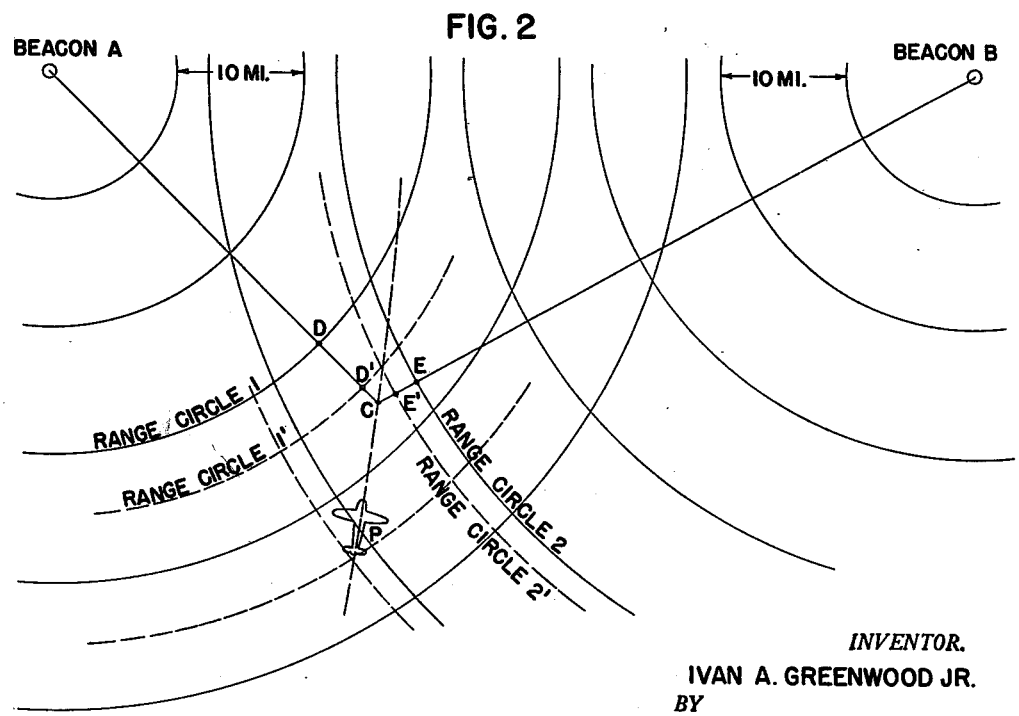
Fig. 2 is a diagram explaining an alternative method of beacon navigation.

Referring now more particularly to Fig. 2 for a general explanation of an alternate navigating method, known as the "hyperbolic" approach, beacons A and B represent the radio responder beacons, and C and P represent the destination and aircraft as in Fig. 1. In this approach the aircraft P flies a hyperbolic path passing through the desination C, the hyperbolic path being the locus of points of constant range difference to the two beacons. Thus by delaying the signal received from the beacon nearer the destination by a constant time interval, a voltage can be produced indicative of the range from the aircraft to said nearer beacon plus the difference between the ranges from the two beacons to the designation. A voltage will also be produced indicative of the range from the aircraft to the beacon more remote from the destination. The aircraft will then be flown on a hyperbolic course passing through the destination if the ranges to the beacons are indicated as equal.

As the indicated range from the aircraft to each beacon constantly changes throughout the course, the indicated range from the aircraft to either beacon may be compared with the range from the destination C to that beacon which would be indicated if the aircraft were at the destination and thus the time of arrival is determined.

As was true in the case of the "cat and mouse" approach, more accurate comparison of ranges can be made if the responses from both beacons are delayed, and the aircraft is flown along a hyperbolic course which is the locus of point having a constant range difference from two nearby range circles, each range circle corresponding to one of a plurality of stepped delays.

Since the destination C shown in Fig. 2 lies on a very short hyperbolic path with respect to the range circles 1 and 2, either an extremely short opportunity would be given for the pilot to get on course, or adjustments would have to be made in the apparatus during the approach. To eliminate these difficulties and to allow the aircraft to be flown on a hyperbolic course, all points of which are equidistant from two range circles, the system is arranged so that range circles 1 and 2 may be shifted to range circles 1' and 2' respectively. The destination is reached when either of the voltages representing the range to circles 1' or 2' becomes equal to a preset voltage proportional to CD' and CE' respectively.

Referring now more particularly to Fig. 3, pip generator 10 generates a series of sharp voltage pulses separated in time by an amount corresponding to the time required for the response to be received from a beacon at 10-mile range. Generator 10 may be any accurate, conventional pulse generator. The output of pip generator 10 is applied to frequency divider 11 which divides the frequency of the pulses produced by pip generator 10 to produce pulses at the pulse repetition frequency (PRF) of the radio object detection apparatus to be described below.

The pulses produced by frequency divider 11 are applied to gate generator 12 which produces approximately rectangular gating pulses, the initiations of which coincide in time with the pulses produced by frequency divider 11. Gate generator 12 may be any circuit capable of producing an approximately rectangular pulse on being triggered and might include a multivibrator circuit. The gate pulses produced by generator 12 along with the 10-mile range pulses from generator 10 are applied to coincidence circuit 13 which is so arranged that only those 10-mile range pulses which coincide in time with the gate pulse pass through to transmitter 15 of radio object detection apparatus 16. Gate generator 12 is included in order to make it certain that pulses from pip generator 10 can cause operation of transmitter 15 even if there is a slight delay in frequency divider 11. If there is no such delay, gate generator 12 may be omitted.

Radio object detection apparatus 16 includes transmitter 15, receiver 17, transmit-receive (T-R) box 18, and antenna 19. Transmitter 15 and receiver 17 are both connected through T-R box 18 to antenna 19.

The output of frequency divider 11 is also applied to step delay circuit 22. This circuit may consist of any circuit capable of producing a pulse which is delayed after the applied pulse by selectable predetermined amounts and may consist of a multivibrator circuit producing a square pulse initiated by the applied pulse and having a variable width. A differentiating circuit may be used to produce a sharp pulse at the trailing edge of the rectangular pulse. The delay introduced by circuit 22 is controlled by either potentiometer 23 or 24 depending upon the position of switch 25. Potentiometers 23 and 24 are each connected between a source of positive potential and ground. Contactors 27 and 28 are movable along potentiometers 23 and 24 respectively in steps and determines the amounts of delay obtained in the two positions of switch 25. Switch 25 has positions "A" and "B."

The delayed reference pulse produced by step delay circuit 22 is applied to gate circuit 30 which produces an approximately rectangular pulse having a time duration corresponding to about 15 miles of beacon range. Gate circuit 30 may be of a construction similar to that of gate generator 12. The 15-mile gate is applied to coincidence circuit 31 along with the series of 10-mile pulses produced by generator 10. Only the 10-mile range pulse in time coincidence with the 15-mile gate pulse appears in the output of circuit 31 and is applied to continuous delay circuit 32. Coincidence circuit 31 may be any conventional coincidence circuit and may include a tube which is biased to be conductive only by the combined application of two pulses.

Continuous delay circuit 32 is similar in construction to step delay circuit 22 and includes a switch 33 having positions "A" and "B." However, the adjustment of circuit 32 is continuous rather than in steps as in the case of circuit 22. In the "A" position switch 33 connects movable contactor 34 of potentiometer 35. In the "B" position, switch 33 connects with movable contactor 36 of potentiometer 37. Potentiometers 35 and 37 are each connected between a source of positive potential and ground. Contactors 34 and 36 are continuously adjustable to give an amount of delay determined by whether switch 33 is in the "A" or "B" position. Delay circuit 32 may be shorted out by switch 38.

The output of continuous delay circuit 32 is applied to sweep circuit 40 and range delay circuit 41. Sweep circuit 40 provides a sawtooth sweep wave of variable length and initiated at the appearance of each reference pulse from continuous delay circuit 32. Sweep circuit 40 includes switch 42 having "A" and "B" positions. In the "A" position, switch 42 connects with contactor 43 of potentiometer 44. In position "B," switch 42 connects with contactor 45 of potentiometer 46. Potentiometers 44 and 46 are each connected between a source of positive potential and ground. The setting of the potentiometer contactor with which switch 42 is connected determines the length of the sawtooth sweep wave produced by circuit 40. The output of circuit 40 is applied to the deflection coils 50 of cathode ray tube 51. Cathode ray tube 51 also includes electron gun 52, control grid 53, and fluorescent screen 54. Deflection coils 50 are rotated about the axis of cathode ray tube 51 in synchronism with the rotation of antenna 19.

Range delay circuit 41 receives the delayed reference pulse produced by continuous delay circuit 32 and an error voltage through line 55. Circuit 41 produces an additional delay sufficient to provide a total delay to correspond to the range of the beacon being tracked. Range delay circuit 41 may be any circuit capable of delaying the reference pulses produced by continuous delay circuit 32 in accordance with the control voltage received through line 55. The output of range delay circuit 41 is applied to control grid 53 of cathode ray tube 51 and to range tracking circuit 58.

Range tracking circuit 58 also receives the output of receiver 17 of radio object detection apparatus 16. Range tracking circuit 58 may be any circuit capable of comparing the beacon response from receiver 17 with the delayed reference pulse from range delay circuit 41, and producing an error voltage of a magnitude and polarity indicating the time difference between said pulses. Range tracking circuit 58 may be of the type described in the application by Andrew B. Jacobsen, Serial No. 584,233, entitled "Electrical Circuit," filed March 1945, now Patent No. 2,609,533, dated September 2, 1952.

The output of range tracking circuit 58 is applied through switch 60 to either memory circuit A or memory circuit B. The memory circuit may be constructed in the manner disclosed in the above mentioned application Serial No. 584,233. Memory circuits A and B are arranged to momentarily receive error voltage from range tracking circuit 58 and to give continuously an output indicative of the range of the beacon being tracked, said range changing between inputs from circuit 58 in accordance with the preceding rate of change of the range. Switch 61 connects the output of memory circuit A or B through line 56 to range delay circuit 41.

The outputs of memory circuits A and B are applied to pilot's direction indicator (PDI) circuit 63 provided with the switch 64, an adjustment knob 65, and PDI meter 66. Switch 64 has a "cat and mouse" position and a "hyperbolic" position. PDI circuit 63 may be any circuit capable of comparing the output of memory circuit A with a preset measure of the range to a beacon when switch 64 is in the "cat and mouse" position and also capable of comparing the output of memory circuit A with the output of memory circuit B when switch 64 is in the "hyperbolic" position. PDI circuit 63 will be explained more fully below with reference to Fig. 6.

Distance-to-go (DTG) circuit 68 receives an input from memory circuit B. DTG circuit 68 is provided with adjustment knob 69 and DTG meter 70. DTG circuit 68 may consist of any circuit capable of comparing the output of memory circuit B with a preset measure of a beacon range. DTG circuit 68 will be explained more fully below with reference to Fig. 7.

An indication of the rotation of antenna 19 is transmitted to differential gear assemblies 74 and 75 provided with adjusting knobs 76 and 77 respectively. The output shafts of differentials 74 and 75 turn cams 78 and 79 respectively. Cam follower 82 is mounted on member 83 which is pivoted at 84. Spring 85 attached to member 83 tends to hold cam follower 82 in a vertical position. Member 83 is connected to switches 25, 33, 42, 60, and 61.

Figure 5:
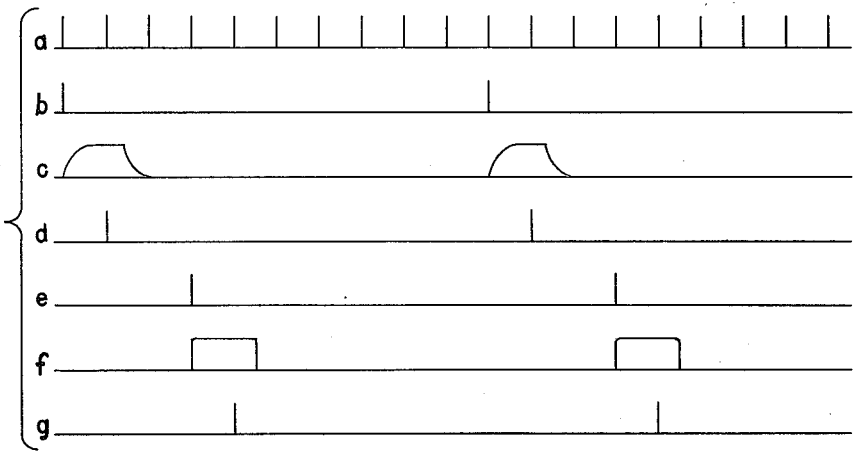
Fig. 5 is a diagram used in explaining the operation of one part of this invention.

Referring now more particularly to Figs. 3 and 5 for an explanation of the operation of this invention, pip generator 10 produces the pulses shown in Fig. 5a, these pulses being accurately spaced by a time interval corresponding to 10 miles of range. Frequency divider 11 produces pulses at the repetition frequency required for transmitter 15 as shown in Fig. 5b. Gate generator 12 produces a gating pulse as shown in Fig. 5c. Coincidence circuit 13 allows the 10-mile pulse from generator 10 which coincides with the gate from generator 12 to pass to transmitter 15 as shown in Fig. 5d.

The pulse received from coincidence circuit 13 triggers transmitter 15 and causes that transmitter to produce a short-pulse of radio frequency energy which is transmitted through T-R switch 18 and radiated in a narrow directional beam by antenna 19 which is continuously rotating.

The output of frequency divider 11 as shown in Fig. 5b is applied to step delay circuit 22. Contactors 27 and 28 are normally adjusted to one of the steps along potentiometers 23 and 24 respectively to give the proper delays corresponding to the ranges to the beacons from the range circles nearest the destination and between the beacons and the destination. For example, in the cases illustrated in Figs. 1 and 2, contactor 27 would be set on the third step to give a delay corresponding to 30 miles, distance A—D, and contactor 28 would be set on the fifth step to give a delay corresponding to 50 miles, distance B—E. It is, however, within the scope of this invention to use delays corresponding to any range circle. Potentiometers 23 and 24 are, for the case described, adjustable in 10-mile steps. Whether the delay inserted by circuit 22 is governed by potentiometer 23 or potentiometer 24 is determined by switch 25, the position of which is determined by member 83 attached to cam follower 82.

Knobs 76 and 77 are manually adjusted so that when antenna 19 points toward beacon A the raised portion of cam 78 coacts with cam follower 82. When antenna 19 points toward beacon B, the raised portion of cam 79 coacts with cam follower 82. Cam follower 82 may be made flexible to guard against breaking if, during adjustment of knobs 76 and 77, the raised portions of cams 78 and 79 coact with cam follower 82 simultaneously. Thus, when beacon A is being interrogated, switch 25 is in its "A" position, and when beacon B is being interrogated, switch 25 is in its "B" position.

The output of step delay circuit 22 shown in Fig. 5e is applied to gate generator 30. It will now be seen that the pulse shown in Fig. 5e has been delayed with respect to the pulse shown in Fig. 5b whereas the actual delay time being measured is the time interval between the pulse in 5d and that in 5e. This arrangement is used so that the pulse in 5e can be given any delay down to zero with respect to the pulse in 5d which is the time of transmission of an interrogating pulse by antenna 19.

Gate generator 30 produces a rectangular gating pulse shown in Fig. 5f, which is applied to coincidence circuit 31. Coincidence circuit 31 also receives the series of 10-mile pulses from generator 10 as shown in Fig. 5a. The output of circuit 31 is the 10-mile pulse from generator 10 which coincides in time with the 15-mile gate from circuit 30. Thus extremely accurate reference pulses, as shown in Fig. 5g, are generated at any desired multiple of 10 mile range.

In the "cat and mouse" approach, switch 38 is closed and the delayed reference pulses seen in Fig. 5g will be applied directly to sweep circuit 40 and range delay circuit 41. A sweep wave is thus initiated and the trace on the screen 54 of tube 51 starts to move from the center of the screen toward the periphery with the arrival of the pulse shown in Fig. 5g. The pulse of Fig. 5g is further delayed by range delay circuit 41 by a time proportional to the distance from the corresponding range circles to the aircraft. The delayed reference pulse produced by circuit 41 is applied to control grid 53 and produces an intensified trace on screen 54 at a distance from the center of the tube proportional to the distance from the aircraft P to the corresponding range circle and having an azimuth indicative of the azimuth from the aircraft to the beacon interrogated.

The output of range delay circuit 41 is also applied to range tracking circuit 58 where its position in time is compared with the time of arrival of the beacon response as received from receiver 17. When antenna 19 points at beacon A, switch 60 connects circuit 58 with memory circuit A and memory circuit A is supplied with an error voltage indicative of the time difference between the arrivals of the reference pulse from delay circuit 41 and the beacon response. Memory circuit A stores a measure of the range to beacon A and, when the antenna 19 points at beacon A, switch 61 connects memory circuit A with range delay circuit 41 so that range delay circuit 41 delays the reference pulse in accordance with the range to beacon A. When antenna 19 points at beacon B the range tracking circuit 58 compares the reference pulse with the beacon response received from receiver 17 and applies an error voltage through switch 60 to memory circuit B. At this time, switch 61 applies a measure of the range to beacon B to range delay circuit 41 to determine the range delay given the reference pulse.

In "cat and mouse" approach, PDI circuit 63 is adjusted to compare the output of memory circuit A with a preset measure of the distance between the destination C and range circle 1, or distance D—C in Fig. 1. The difference between the range to range circle 1 from the aircraft and the distance from the destination to range circle 1 is indicated by meter 66 which therefore indicates to the pilot whether or not his aircraft is at the proper distance from beacon A and may be called "pilot's direction indicator." In this method of approach DTG circuit 68 compares the output of memory circuit B with a preset measure of the distance from the destination to range circles 2 or distance C—E, as seen in Fig. 1. The destination is reached when DTG meter 70 and PDI meter 66 both indicate zero.

Sweep circuit 40 is also provided with a switch 42 which is placed in an "A" position when antenna 19 points at beacon A and in position "B" when the antenna points at beacon B. Adjustment of contactors 43 and 45 of potentiometers 44 and 46 respectively adjusts the slope of the sweep wave produced by generator 40 and thus adjusts the speed of the trace on screen 54. Thus the sweep speed may be increased when beacon A is being interrogated with respect to the sweep speed when beacon B is being interrogated. This results in an expanded sweep during the interrogation of beacon A, and tube 51 thus gives a more accurate indication as to whether aircraft P is positioned on its correct circuit course. It will be obvious that contactors 43 and 45 can be adjusted to give equal slopes of the deflection wave, if this is desired.

Fig. 4 shows the appearance of screen 54 of tube 51. The range marks 90 and 91 indicate the position of beacons A and B in polar coordinates and show the coded responses giving a visual indication that the proper beacons are tracked. At times other than during the short arcs when the switch actuating member 83 is acted on by cam 78 or 79, the range mark circle may be at the periphery of screen 54 as shown at 92.

When the "hyperbolic" approach is used, switch 38 is open, thus placing continuous delay circuit 32 in position to delay the reference pulse received from coincidence circuit 31. Contactors 43 and 45 of potentiometers 44 and 46 are normally adjusted to give equal sweep slopes when this approach is used. Contactors 34 and 36 of potentiometers 35 and 37 respectively are adjusted to introduce delays corresponding to the distances D—D' and E—E' shown in Fig. 2. This procedure allows the destination C to be placed in the far corner of the range circles 1' and 2' being used. It also allows the destination C to be equidistant from range circles 1' and 2' so that aircraft P is on its course when range markers 90 and 91 on screen 54 of tube 51 appear at equal radial distances from the center of the screen.

In the "hyperbolic" approach a measure of the distance C—E' is compared with the distance P—E' as seen in Fig. 2. This comparison is made by DTG circuit 68 and indicated by DTG meter 70, so that it may be determined when the aircraft has arrived at the destination.

In both the "cat and mouse" and "hyperbolic" approaches DTG circuit 68 indicates when the destination is reached and actuates bomb-release circuit 71 so that the latter causes the bombs carried by the aircraft to be released.

It is obvious that circular traces corresponding to given ranges may be placed on screen 54 to aid in determining whether the aircraft P is on course. It is further obvious that these range circles may be produced electronically on screen 54 at adjustable predetermined distances from the center of the screen so that it may accurately be known when the aircraft has reached a certain predetermined position or whether it is positioned off its predetermined course.

Figure 6:
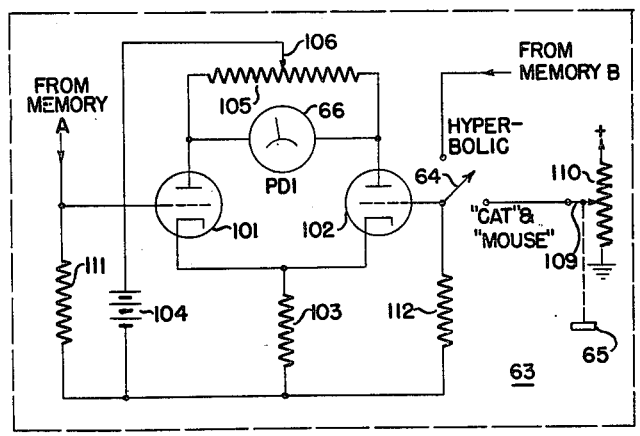
Fig. 6 is a schematic diagram of a pilot direction indicator circuit.

Fig. 6 shows a possible circuit for use as PDI circuit 63. Triodes 101 and 102 have their cathodes connected through a common resistor 103 to a source of negative potential, here represented as one terminal of battery 104. The plates of tubes 101 and 102 are each connected to an end of potentiometer 105. Contactor 106 of potentiometer 105 is connected to a source of positive potential such as the other terminal of battery 104.

The grid of tube 101 is connected to the output of memory circuit A. The grid of tube 102 is connected to switch 64 which in its "cat and mouse" position connects to the contactor 109 of potentiometer 110, this potentiometer being connected between a source of positive potential and ground. Contactor 109 is adjusted by means of knob 65. In its "hyperbolic" position, switch 64 connects with the output of memory circuit B. The grids of tubes 101 and 102 are also connected through resistors 111 and 112 respectively to the source of negative potential. The source of potential 104 must be "floating" with respect to ground.

It is obvious that triodes 101 and 102 will, in the "cat and mouse" position of switch 64, compare the output of memory circuit A with the voltage picked up by adjustable contactor 109 from potentiometer 110. PDI meter 66 will indicate this comparison. With switch 64 in its "hyperbolic" position the circuit will compare the output of memory circuit A with the output of memory circuit B and indicate this comparison on meter 66.

Figure 7:
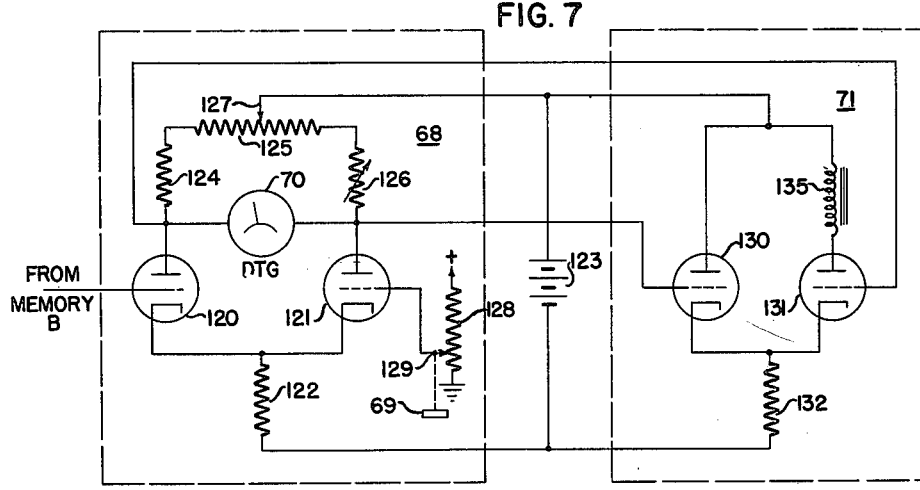
Fig. 7 is a schematic diagram of a distance-to-go meter circuit and bomb release circuit.

Fig. 7 shows circuits which could be used for DTG circuit 68 and bomb release circuit 71. Circuit 68 includes triodes 120 and 121, the cathodes of which are connected through common cathode resistor 122 to a source of negative potential here represented as one terminal of battery 123. The plate of tube 120 is connected through resistor 124 to one end of potentiometer 125. The plate of tube 121 is connected through variable resistor 126 to the other end of potentiometer 125. Contactor 127 of potentiometer 125 is connected to a source of positive potential here represented as the other terminal of battery 123. Meter 70 is connected between the plates of triodes 120 and 121.

The grid of triode 120 is connected to memory circuit B while the grid of triode 121 is connected to adjustable tap 129 on potentiometer 128. Tap 129 is adjusted by knob 69. It will be obvious that circuit 68 operates to compare the voltage produced by memory circuit B with the adjustable voltage picked up by tap 129 from potentiometer 128. This comparison is indicated by meter 70.

Bomb release circuit 71 may include triodes 130 and 131, the cathodes of which are connected through resistor 132 to the negative terminal of source 123. The plate of triode 130 is connected to the positive terminal of source 123 while the plate of triode 131 is connected through the coil of relay 135 to said positive terminal. The grid of triode 130 is connected to the plate of triode 121 while the grid of triode 131 is connected to the plate of triode 120. Triodes 130 and 131 are so arranged that when the voltage at the plates of triodes 120 and 121 are equal, sufficient current will flow through triode 131 to operate relay 135. Relay 135 operates to release the bombs carried by the aircraft.

It will be obvious that the destination C in Figs. 1 and 2 need not necessarily be the ultimate destination but only an intermediate navigating point from which the aircraft may proceed to another point defined by other beacons. In such a case the bomb release circuit would be rendered inoperative until the ultimate destination is approached.

It will also be obvious that the system herein described is not necessarily restricted to use with radio beacons but may be used with any beacons, the responses of which travel a constant distance per unit time.

It will further be obvious that the distance between range circles and the corresponding intervals between the pips of Fig. 5a need not be restricted to 10 miles but could be of any magnitude.

While there has been described what is at present considered to be the preferred embodiment of this invention, it will be obvious to those skilled in the art that various changes and modifications may be made therein without departing from the scope of the invention as set forth in the appended claims.

The invention claimed is:

1. A navigation system for continuously determining the location of a mobile craft relative to first and second fixed beacon stations located at known position comprising: a first means for generating a first series of pulses of energy having a fixed repetition frequency; second means coupled to said first means for developing a second series of pulses of energy at a given subharmonic frequency of said fixed repetition frequency in which each pulse of energy of said second series occurs in time coincidence with a certain pulse of energy of said first series; interrogation means in said craft adapted to be triggered by pulses of energy applied thereto for alternately interrogating each of said beacon stations and receiving a response therefrom; means for applying said second series of pulses of energy to said interrogating means to effect the triggering thereof; third means coupled to said first and second means for developing a third series of pulses of energy at said given subharmonic frequency in which each pulse of energy of said third series occurs in time coincidence with a particular pulse of energy of said first series; fourth means for producing a signal; fifth means coupled to said fourth means for alternately switching the value of a characteristic of said signal between two independent predetermined values in synchronism with the interrogation of each beacon station; means for applying said signal to said third means for selecting the particular pulse of energy from said first series in accordance with the value of said characteristic, whereby the time of occurrence of each pulse of energy in said third series relative to the time of occurrence of each pulse of energy in said second series is an exact multiple, which is determined by said predetermined values, of the time interval between successive pulses of energy of said first series, and represents a respective fixed distance from each beacon station when that beacon station is being interrogated; sixth means effective when triggered to initiate a single timing wave having a period less than the time interval between successive pulses of energy of said first series; means responsive to said third series of pulses of energy for triggering said sixth means; an indicator; means establishing a time base on said indicator in accordance with said timing wave; and means for applying said received responses to said indicator for producing an indication along said time base.

2. A navigation system according to claim 1, where said craft is navigated to a known objective along a hyperbolic path; wherein said means responsive to said third series of pulses of energy for triggering said sixth means includes seventh means for alternately providing a first and second time delay between the time of occurrence of each pulse of energy of said third series and the initiation of said timing wave in synchronism with the interrogation of said first and second beacon stations, said first and second delays being smaller than the time interval between successive pulses of energy of said first series and being adjusted so that the difference therebetween is proportional to the difference between the distance between the objective and the fixed distance to the first beacon and the distance between the objective and the fixed distance to the second beacon, whereby the craft is on course when the indications of the responses from the first and second beacons along the time base represent equal distances.

3. A navigation system according to claim 1, wherein said sixth means includes means for alternately switching the period of said timing wave between two independently adjustable predetermined values in synchronism with the interrogation of said first and second beacon stations.

4. A navigation system according to claim 1, wherein said second means comprises a frequency divider coupled to said first means, said frequency divider producing one output pulse of energy for each fixed plurality of successive pulses of energy of said first series, said output pulse of energy being in approximate time coincidence with the first of said fixed plurality of successive pulses of energy, a first gate generator coupled to said frequency divider producing a first gate pulse of energy which is initiated in time coincidence with each output pulse of energy of said frequency divider and has a duration greater than one and less than two times the time interval between successive pulses of energy of said first series, and a first coincidence circuit coupled to said first means and said first gate generator for producing an output only during the simultaneous presence of a first gate pulse of energy and a pulse of energy of said first series; wherein said third means comprises delay means coupled to said frequency divider for providing an output pulse of energy having a delay relative to the output pulse of energy of said frequency divider, a second gate generator coupled to said delay means producing a second gate pulse of energy which is initiated in time coincidence with each output pulse of energy of said delay means and has a duration greater than one and less than two times the time interval between successive pulses of energy of said first series, and a second coincidence circuit coupled to said first means and said second gate generator for producing an output only during the simultaneous presence of a second gate pulse of energy and a pulse of energy of said first series; and wherein said fourth means includes means for independently adjusting the predetermined values of said characteristic of said signal when said first and second beacon stations, respectively, are being interrogated to have any one of a plurality of values, and means for applying said signal to said delay means to determine the delay provided by said delay means in accordance with said predetermined values.

IVAN A. GREENWOOD, Jr.

REFERENCES CITED

The following references are of record in the file of this patent:

UNITED STATES PATENTS

| Number | Name | Date |
|---|---|---|
| 2,137,847 | Libman | Nov. 22, 1938 |
| 2,396,112 | Morgan | Mar. 5, 1946 |
| 2,399,661 | Bowie | May 7, 1946 |
| 2,403,527 | Hershberger | July 9, 1946 |
| 2,405,238 | Seeley | Aug. 6, 1946 |
| 2,408,048 | Deloraine et al. | Sept. 24, 1946 |
| 2,408,848 | Hammond | Oct. 8, 1946 |
| 2,430,570 | Hulst, Jr. | Nov. 11, 1947 |
| 2,445,361 | Mountjoy et al. | July 20, 1948 |
| 2,508,565 | Chance | May 23, 1950 |
| 2,512,923 | Dippy | June 27, 1950 |

FOREIGN PATENTS

| Number | Country | Date |
|---|---|---|
| 552,072 | Great Britain | Mar. 22, 1943 |